Nov. 11, 1969  R. E. SHELHART  3,477,378
HYDRAULIC POWER UNIT WITH DISC MOTOR
Filed June 6, 1968  3 Sheets-Sheet 1
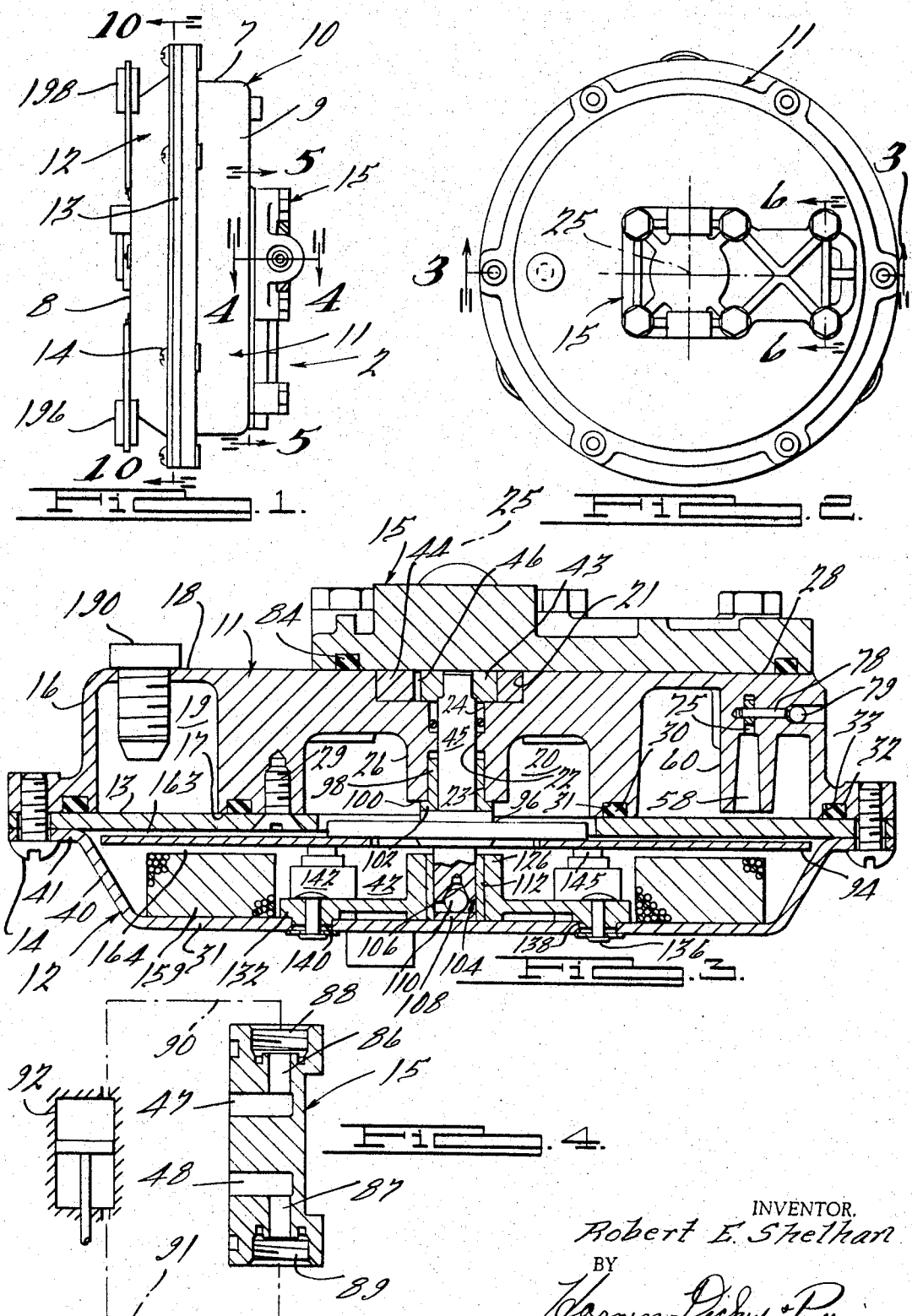
INVENTOR.
Robert E. Shelhart
BY
Harness, Dickey & Pierce.
ATTORNEYS.

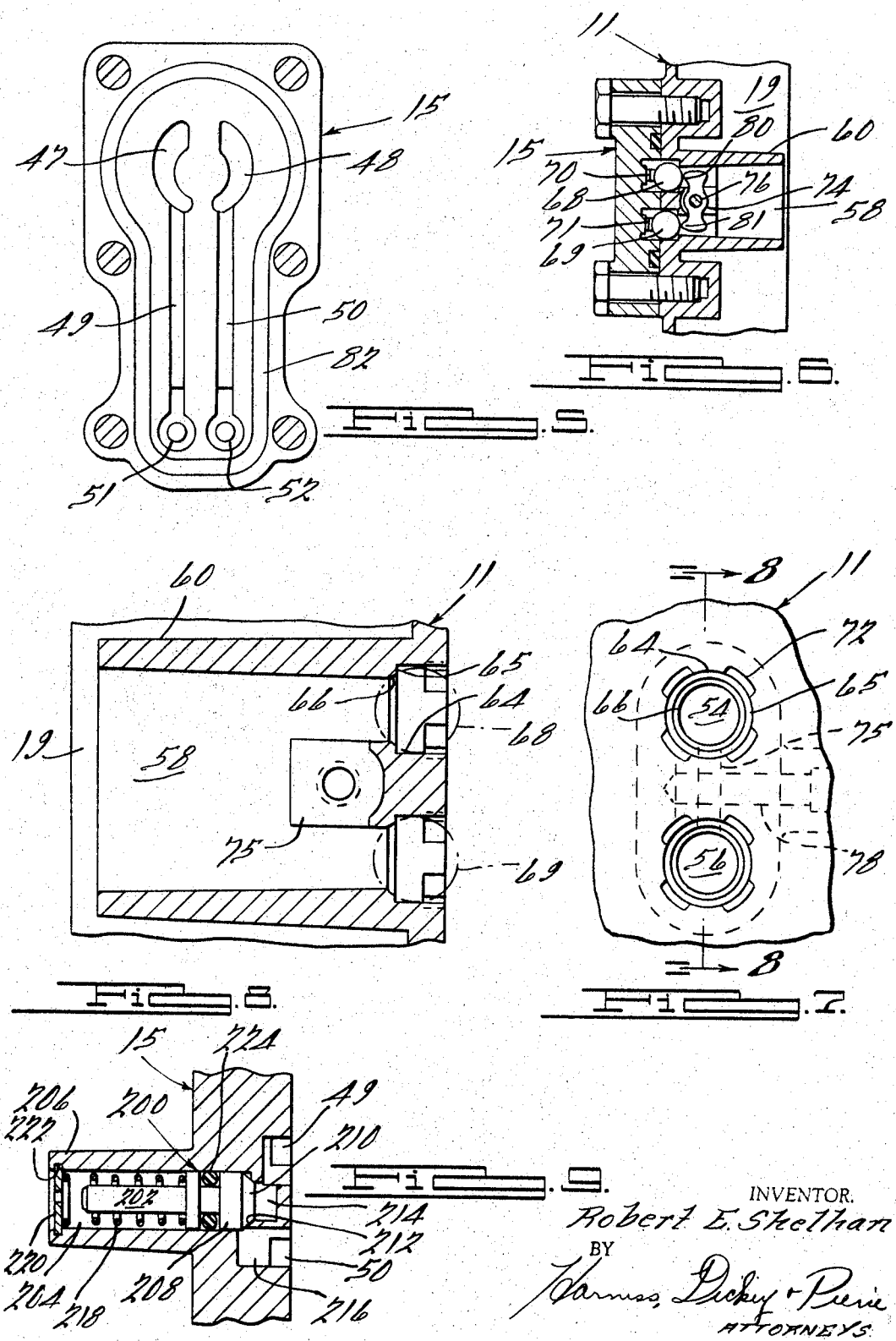

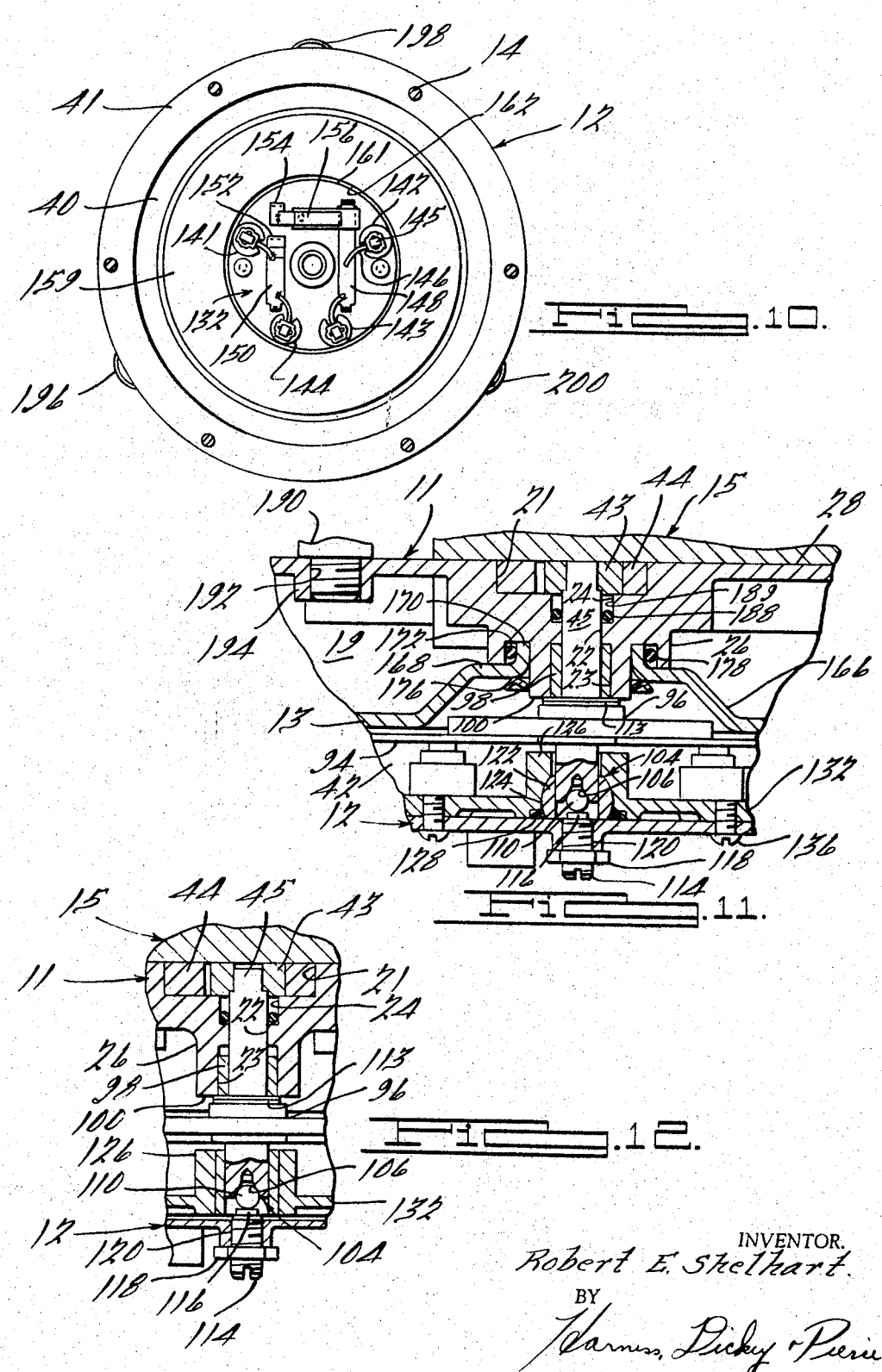

United States Patent Office 3,477,378
Patented Nov. 11, 1969

3,477,378
HYDRAULIC POWER UNIT WITH DISC MOTOR
Robert E. Shelhart, Dearborn, Mich., assignor to Dura Corporation, Oak Park, Mich., a corporation of New York
Filed June 6, 1968, Ser. No. 734,985
Int. Cl. F04c *15/02;* F15b *15/18;* H02k *1/22*
U.S. Cl. 103—118                                                23 Claims

ABSTRACT OF THE DISCLOSURE

There is herein disclosed an electric motor-hydraulic pump-hydraulic reservoir power unit for operation of a hydraulic actuator or the like of the type used to actuate vehicle windows, convertible tops, and the like.

SUMMARY OF INVENTION

The inventive features reside in a power unit of relatively narrow width disc-like peripheral configuration. A motor compartment, a reservoir compartment, a pump chamber, and hydraulic passages are formed in the unit in a new and improved manner from pump-reservoir block means, separating plate means, cover plate means, and passage block means. The parts of a disc armature motor are mounted in the motor compartment and connected to pump means in the pump chamber in a new and improved manner. A motor drive shaft and a disc armature connected thereto are supported in the unit in a new and improved manner by new and improved bearing means. New and improved valve means control flow of hydraulic fluid between the pump chamber and the reservoir compartment.

BRIEF DESCRIPTION OF THE DRAWINGS

FIGURE 1 is a side elevational view of a power unit incorporating the principles of the present invention;

FIGURE 2 is an end view of the unit shown in FIGURE 1 taken in the direction of the arrow 2 in FIGURE 1;

FIGURE 3 is a cross-sectional view taken along the line 3—3 in FIGURE 2;

FIGURE 4 is a sectional view taken along the line 4—4 in FIGURE 1;

FIGURE 5 is a sectional view taken along the line 5—5 in FIGURE 1;

FIGURE 6 is a sectional view taken along the line 6—6 in FIGURE 2;

FIGURE 7 is an enlarged partial end view with parts removed of a portion of the unit shown in FIGURE 6;

FIGURE 8 is a sectional view taken along the line 8—8 in FIGURE 7;

FIGURE 9 is a cross-sectional view of a portion of the unit shown in FIGURE 2 incorporating an optional relief valve;

FIGURE 10 is a cross-sectional view of the unit of FIGURE 1 taken along the line 10—10 with the armature removed;

FIGURE 11 is a cross-sectional partial view of a unit of the type shown in FIGURES 1–10 illustrating alternative embodiments of certain features; and FIGURE 12 is a cross-sectional partial view of a unit of the type shown in FIGURES 1–10 illustrating another embodiment of certain features.

DETAILED DESCRIPTION

Referring now to FIGS. 1–3, the inventive features are embodied in a relatively thin narrow width electric motor-hydraulic pump-hydraulic reservoir power unit 10 having a generally annular relatively flat pancake-like configuration which is particularly adapted for use in vehicular applications such as with window regulator apparatus or convertible top apparatus.

The overall disc-shaped configuration of the power unit as shown in FIGS. 1–2 includes generally annular side wall means 7 extending between generally parallel end wall means 8, 9. The unit includes pump-reservoir block means in the form of an aluminum die cast housing 11 and cover means in the form of an annular sheet steel motor cover plate 12. A plate means in the form of an annular sheet steel separating plate 13 is mounted on the housing 11 by suitable fastening means 14. Separate passage block means 15, which may also be formed of die cast aluminum material, is mounted on the pump housing by suitable fastening means. In the illustrative embodiment, the overall diameter of the unit is approximately 7", the width between opposite side walls of the unit is approximately 2", and overall width including passage block 15 and appendages is approximately 3".

Housing 11 has an overall disc-shaped peripheral configuration defined by an annular peripheral side wall surface 16, an inner side surface 17, and an outer side surface 18. One or more side opening chambers are formed in the pump housing including an annular reservoir chamber 19 opening through the inner side surface 17, an annular motor chamber portion 20 also opening through the inner side surface 17, and a pump chamber 21 opening through the outer side surface 18. A drive shaft bore 22 has a bearing counterbore 23 at one end and a sealing ring counterbore 24 at the other end. The bore is located on central axis 25 of the unit, which is also the central axis of the pump housing, the motor, the motor shaft, and the pump as will hereinafter become more apparent. Bore 22 connects pump chamber 21 to motor chamber portion 20 through a bearing and locating hub means 26.

Separating plate 13 is mounted on the inner side surface of the pump housing to form a reservoir compartment by closing off and separating the reservoir chamber 19 from the motor chamber. The inner side surface 17 is machined smooth and parallel to a passage housing support surface 28 on the outer wall. Fastening means 29 hold the radially innermost portion of the separating plate in tight sealing engagement with the inner side surface 17 against an O-ring seal 30 in annular groove 31. The radially outermost portion of the separating plate is held in tight sealing engagement with the inner side surface 17 against an annular O-ring seal 32 in annular groove 33 by the fastening means 14.

Cover plate 12 is dish-shaped to form a motor chamber and comprises a base portion 31 extending transversely to central axis 25, an inclined peripheral wall portion 40, and an attaching flange 41 extending parallel to the base portion. When cover plate 12 is secured to the pump housing, an enclosed motor compartment is provided which includes motor chamber portion 20 of housing 11 and a chamber portion 42 between the cover plate and the separating plate.

A reversible pump means of conventional design is mounted in annular pump chamber 21 in housing 11 and comprises inner and outer rotor sets 43, 44. Inner rotor 43 is drivably mounted on a reversely rotatable drive shaft means 45 so as to form a movable fluid pocket 46 by which fluid is moved between kidney-shaped pump inlet and outlet ports 47, 48, FIGS. 4–5, in passage block 15. Ports 47, 48 are connected by passages 49, 50 and 51, 52, FIG. 5, to valved openings 54, 56, FIG. 7, in housing 11. Pump chamber 21 is centrally located on the central axis 25 of the unit with passages 49, 50 extending generally radially transversely outwardly of the axis and passages 51, 52 extending generally parallel to the axis. A passage 58, FIG. 6, formed in a sleeve-like extension 60 of housing 11, connects openings 54, 56 to pump reservoir 19.

Referring now to FIGS. 7 and 8, each of the openings 54, 56 comprises valve chamber means in the form of an annular counterbore 64 which terminates in a shoulder 65 having an inwardly tapered valve seat 66 upon which valve means in the form of balls 68, 69 are adapted to be seated to close the openings 54, 56. Balancing springs 70, 71 bias each ball valve toward the closed position. The other ends of the openings are provided with circumferentially spaced flow channels 72 which facilitate flow when the valves are in an open position.

The valves are adapted to be moved simultaneously in opposite directions between open and closed positions by mechanical valve positioning means in the form of a valve rocker arm 74, FIG. 6, pivotally mounted in a slot 75, FIGS. 7–8, extending between the passages 54, 56, on a rocker arm pin 76, FIG. 6, mounted in a counterbored passage 78 extending generally radially inwardly through the side of housing 11, as shown in FIG. 3. Pin 76 is secured in place by any suitable means such as a pressed fitted retainer ball 79. The ball valves are held in engagement with rounded end portions 80, 81 of the rocker arm so as to be movable equally in opposite directions.

A peripheral sealing groove 82, FIG. 5, is provided in passage block 15 and receives a loop of sealing material 84, FIG. 3. Ports 47, 48 are also connected to transverse radially extending passages 86, 87, FIG. 4, which terminate in actuator connecting inlet and outlet ports 88, 89 in the form of threaded sockets by which the pump is connected by fluid lines 90, 91 to fluid operable actuator mechanism, such as a double acting hydraulic cylinder 92, commonly used to operate vehicle window regulator mechanism or convertible top linkage.

Referring now to FIG. 3, the inner rotor 43 of the pump means and drive shaft 45 are reversely operable by means of disc armature type reversibly rotatable electric motor means about a common axis of rotation 25. A disc armature 94 of conventional design is attached to and concentrically supported by a shaft hub portion 96. Bearing means in the form of a bearing sleeve 98 is mounted in and radially located by hub means 26 integral with housing 11. A transverse hub surface 100 abuts one side of a transverse bearing flange portion 102 and axially locates the bearing sleeve. The adjacent side surface of shaft hub portion 96 abuts and is axially located by the other side of the bearing flange. It will be seen that the armature 94 is also axially and radially located relative to housing 11 by bearing sleeve 98. The other end of drive shaft 45 is supported by bearing means 104 mounted on the inside of cover 12 and including thrust bearing means in the form of a conical surface 106, a thrust plate 108, and a ball member 110 mounted therebetween, and a bearing sleeve 112 rotatably supporting the cover end of the drive shaft. In use, the thrust bearing will alleviate axially directed loads such as those exerted by the hydraulic fluid in pump chamber 32 in a direction extending along axis 25 from the pump chamber toward the bearing.

An alternative support arrangement for the drive shaft, shown in FIG. 12, involves replacement of bearing sleeve flange 102 of FIG. 3 by one or more spacing washers 113, the number of which may be varied to accommodate manufacturing tolerances. In order to provide for additional adjustability, the support plate 108 of FIG. 3 is replaced by an adjustable set screw 114 having a bearing surface 116 engageable with the steel ball 110 opposite conical surface 106. A lock nut 118 and a threaded opening 120 in the motor unit cover provide means whereby the axial position of the shaft means may be selectively varied without removal of the cover.

Another, and presently preferred support arrangement for mounting the motor end of the drive shaft is shown in FIG. 11 to comprise a spherical thrust bearing means 122 mounted in a spherical bearing seat means 124 in bearing hub 126. A spring washer 128 holds the bearing means in spaced relationship to the adjoining wall of the unit. Substantial clearance is provided between shaft 45 and hub 126 to accommodate substantial deviation in location of the shaft. In this manner, substantial axial misalignment is accommodated and start-up and direction change thrust loads are better accommodated.

Referring now to FIGS. 3 and 10, support hub 126 is in the form of a bearing support block casting 132 secured to the base portion 31 of dish-shaped cover plate 12 by suitable fastening means 136. In the embodiment of FIG. 3, block 132 also serves as brush holder means and magnet locating means properly located and securely held against rotation by means of annular bosses 138 received in mating openings 140 in the cover plate. Brush holder housings 141, 142, 143, 144, FIG. 10, are integrally formed on the block 132 and each receive a spring-loaded brush element 145 which extends axially into commutating engagement with the adjacent side surface of the disc armature 94 as is well known in the art. In the illustrative embodiment of FIG. 10, there are four brush holder housings and four brushes which are mounted in a particular circumferentially spaced pattern locating the brush elements in proper commutating position relative to the armature. Each brush of like polarity, there being two of each, are connected by suitable wire means 146 to contact plates 148, 150 adapted to be connected to a suitable energy source such as a 12 volt DC battery of a vehicle through terminals 152, 154 and a circuit breaker blade 156 if desired.

An annular permanent magnet 159 is fastened to cover plate 12 in any suitable manner such as by bonding with an epoxy resin adhesive, or the like. The block 132 has an outer peripheral locating surface 161 adapted to nest within a corresponding inner peripheral surface 162 of the magnet in closely spaced locating relationship so as to provide locating means for the magnet during assembly. In this manner, block 132 is precisely located relative to the cover 134 by engagement of the bosses 138 in openings 140. Since armature shaft 45 is supported in hub 126, the armature is precisely located relative to the brushes. Since the magnet is located by the brush holder casting, the armature is also precisely located relative to the magnet so that the relationship of the magnetic field, the brushes, and the armature is closely controlled.

The motor compartment 42 is formed by cover plate 12 and the multiple purpose intermediate plate 13 sandwiched between the cover plate 12 and the housing 11. Plates 13 and cover 12 are made from a magnetic material so as to provide a flux return path across the air gaps 163, 164, FIG. 3, and around the armature 94 to the magnet 159.

Plate 13 may be secured to housing 11 by any suitable fastening means. In one form, FIG. 3, screw members 29 are threaded into housing 11. In another form, FIG. 11, a hub 166 integrally with plate 13 includes a radially extending annular abutment 168 and a transversely extending annular abutment 170 nested within an attaching groove 172 in housing hub 26. A spring retainer 176 secures the plate hub 166 on housing hub 26 with an O-ring sealing means 178 sealingly mounted therebetween in groove 172. Due to the aforedescribed design, the fluid reservoir compartment 19 of FIG. 11 is of larger capacity than the one of FIG. 3.

Pump cavity 21 is sealed from the motor compartment by sealing means 188 mounted in a sealing chamber 189, intermediate the pump chamber and the pump end shaft bearing 98, in cooperative relationship with the drive shaft. Thus, the motor unit and the pump unit are effectively separated from one another while being integrally connected and utilizing some of the same parts for diverse purposes.

Access to the hydraulic reservoir may be provided through a threaded opening closed by plug means 190 of the type shown in FIG. 3, or preferably, through an opening 192 within a fill sleeve 194, FIG. 11, which protrudes into the reservoir a distance sufficient to prevent overflow when the reservoir is filled and to provide an air space preventing complete filling of the reservoir.

The hydraulic power unit may be mounted in inaccessible places of limited size such as vehicle doors or quarter panels by any suitable attaching means such as support arms 196, 198, 200.

Referring now to FIG. 9, a relief valve means 200 may be provided for passages 49, 50 in passage block 15. The relief valve means is shown to comprise a poppet 202 slidably mounted in a valve chamber 204 in a valve housing 206 integral with the pump cover casting. A valve head 208 is provided with a conical valve surface 210 adapted to seat on a corresponding conical valve seat 212 formed about a passage 214 connected to one of the passages 49. The other passage 50 is connected to passage 214 beyond the valve seat 212 by a transverse passage 216. A compression spring 218 biases the poppet to the closed position. The poppet and the spring are held in the valve chamber by any suitable fastening means such as a retainer washer 220 staked over as indicated at 222. An O-ring 224 seals the valve chamber.

ASSEMBLY AND OPERATION

The hydraulic system of the power unit 10 is connected to opposite ends of one or more double acting hydraulic cylinder actuators 92, FIG. 4, such that hydraulic fluid may be reversibly pumped under pressure between the opposite sides of the cylinder actuator. A suitable control switch or the like is provided to reversibly actuate the electric motor by reversing the polarity of current supplied from a suitable source to brushes 145 which connect and commutate electrical winding means on the faces of the disc armature 94. The winding means extends through the magnetic field of magnet 159 whereby the passage of current through the winding means causes rotation of the disc armature. Armature shaft 45 is rotatably supported at one end by bearing means 104 and is drivingly connected at the other end to pump rotor 43 which is rotatably supported in pump chamber 21. Another shaft bearing means 98 is located on the opposite side of the armature from the bearing means 104 intermediate the armature and the pump means on the end of the shaft. Armature shaft 45 and armature 94 are axially located in the housing by a fixed abutment surface 100 which may be located on housing 11 intermediate the armature and the pump means, and by a fixed 108 or adjustable 116 abutment supported by the motor cover. Whether fixed or adjustable, the abutment surface supported by the motor cover may be variably positioned so as to accommodate variations in manufacturing tolerances and enable mass production of the power units.

The end of armature shaft 45 is supported by a ball bearing 110 seated in a conical ball chamber integrally formed on the end of the armature shaft. In the arrangement of FIG. 3, retainer plate 108 is press fitted in position against ball 110 with the axial position of the plate determined by the relative positions and dimensional characteristics of the various parts such as the locating shoulder on hub 26, bearing flange 102, the locating shoulder on the armature hub, the bearing seat 106 at the end of the armature shaft, and the ball bearing 10. Assembly of the shaft and bearing apparatus of FIG. 3 involves loosely mounting the shaft in the motor compartment and then press-fitting plate 108 against the ball bearing to move the armature hub shoulder against the adjacent bearing flange 102 located by the housing hub 26. In order to accommodate relatively wide variations in tolerances, washer means 113 of variable width and number, and an adjustable locating means 114 may be utilized, as shown in FIGS. 11-12, whereby the width of the air gaps 163, 164 adjoining the armature may be more closely controlled Rotation of armature may be more closely rotation of shaft 45 and pump rotor 43. Fluid trapped in pocket 46 is carried between pockets 47, 48 and forced from one side to the other side of the hydraulic cylinder 92. Opposite sides of the hydraulic cylinder have different volumes because of the presence of the cylinder piston and piston rod. Therefore, the amount of hydraulic fluid pumped to the piston rod side of the cylinder is less than the amount of hydraulic fluid pumped to the open side of the cylinder opposite the piston rod. Furthermore, some leakage of hydraulic fluid occurs in the system in use. Therefore, it is necessary to provide a fluid reservoir connected to the pump inlet and outlet ports 47, 48 by passages 49, 50 and 51, 52.

When fluid pressures in the passages 51, 52 are equal, the balancing springs 70, 71 will hold ball valves 68, 69 in balanced positions spaced from valve seats 66 in constant engagement wtih opposite ends of the rocker means 74 which is held in an intermediate neutral position thereby. As the fluid pressure in passages 51, 52 varies, the positions of the ball valves will change correspondingly and oppositely so that, as one ball valve is moved, by pressure of fluid being pumped out of one pocket, toward its valve seat and the closed position, the other ball valve is mechanically moved away from its valve seat toward full open position. Thus, the low pressure side of the pump to which fluid is returning from the hydraulic actuator unit is connected to the fluid reservoir and the high pressure side is disconnected whereby all the fluid is pumped under constant pressure to the hydraulic power unit. The excess of fluid returning to the pump is directed to the reservoir or the deficiency of fluid returning to the pump is made up from fluid in the reservoir. The valves also provide for a by-passing fluid during manual operation of the hydraulic power unit. In the event that excessive pressures are built up in the system, relief valve 200 is operable to connect passage 48 to passage 49. The theory and details of operation of a system of this type are disclosed in United States Patents No. 2,586,682, No. 2,588,644, and No. 2,640, 429 issued to S. B. McLeod.

It is contemplated that the inventive concepts herein disclosed may be otherwise variously embodied and it is intended that the appended claims be construed to include alternative embodiments except insofar as limited by the prior art.

I claim:
1. An electric motor-hydraulic pump-hydraulic reservoir power unit for operation of a hydraulic actuator or the like, said unit being of relatively narrow width disc-like peripheral configuration having a central axis and generally annular side wall means extending thereabout and connecting opposite generally parallel end wall means, said unit comprising:
   a motor compartment;
   a reservoir compartment;
   a pump chamber;
   disc armature electric motor means located in said motor compartment including a disc armature rotatably mounted in said motor compartment and being selectively reversibly rotatable therein about the central axis of the unit;
   rotatable pumping means located in said pump compartment and being reversibly rotatable therein about the central axis of the unit;
   rotatable drive shaft means extending along the central axis of the unit and connecting said disc armature to said pumping means whereby reversible rotation of said armature causes reversible rotation of said pumping means;
   sealing means sealing said reservoir compartment and said pump chamber from said motor compartment; and
   passage means connecting said pump chamber to said reservoir compartment to enable hydraulic fluid to be drawn from and returned to said reservoir by said pump means.

2. The invention as defined in claim 1 and having:
   separate passage block means removably mounted on one of said side wall means in abutting relationship therewith, said passage means being formed in said separate passage block means,
and actuator connecting inlet and outlet ports being formed in said separate passage block means.

3. The invention as defined in claim 2 and there being pump inlet and outlet ports formed in said separate passage block means,
reservoir inlet outlet ports formed in said unit,
and passage means in said separate passage block means connecting said pump inlet and outlet ports to said reservoir inlet and outlet ports.

4. The invention as defined in claim 3 and there being valve means in said reservoir inlet and outlet ports,
valve chamber means opening through said one of said side wall means and being closed by said separate passage block means,
and said valve means being retained in said valve chamber means by said separate passage block means.

5. The invention as defined in claim 4 and having mechanical valve positioning means mounted in said unit adjacent said valve chamber means.

6. The invention as defined in claim 1 and said unit being formed by:
a pump-reservoir block means having an outer side and an inner side in the unit,
a reservoir cavity in said block means opening through said inner side,
plate means mounted on said inner side of said block means over said reservoir cavity and forming a wall of and closing said reservoir compartment,
and cover means mounted on said pump-reservoir block means in spaced relationship to said plate means and forming part of the walls of said motor compartment.

7. The invention as defined in claim 6 and wherein said plate means being made of magnetic material and providing flux return means for said motor means.

8. The invention as defined in claim 7 and wherein said flux return means further comprising:
said cover means being of magnetic material connected at the periphery to said plate means,
motor magnet means attached to the inside of said cover means,
and said armature extending radially about said central axis between and in spaced relationship to each of said magnetic means and said plate means.

9. The invention as defined in claim 6 and wherein:
first shaft bearing means being mounted on the inside of said cover means,
second shaft bearing means being mounted on said pump-reservoir block means,
and said shaft means and the armature being rotatably supported by said first and second bearing means.

10. The invention as defined in claim 9 and one of said bearing means including adjustable thrust bearing means axially locating said shaft means in the unit.

11. The invention as defined in claim 10 and said adjustable thrust bearing means comprising:
a ball bearing,
a ball bearing seat in the end of said shaft means,
and a support plate mounted in abutting engagement with said ball bearing opposite said shaft means.

12. The invention as defined in claim 11 and wherein: said support plate being in the form of axially adjustable means whereby the axial position of the shaft means may be selectively varied.

13. The invention as defined in claim 12 and wherein: said thrust bearing means being mounted on said cover means,
and said adjustable means extends through said cover means and is accessible from without the unit for adjustment without removal of said cover means.

14. The invention as defined in claim 10 and said adjustable thrust bearing including:
spherical bearing means supporting said shaft means, and spherical bearing seat means on one of said shaft bearing means universally supporting said spherical bearing means and said shaft means.

15. The invention as defined in claim 9 and said second bearing means being located intermediate said armature and said pump means.

16. The invention as defined in claim 15 and there being:
a sealing chamber formed in said pump-reservoir block means intermediate said pump chamber and said second bearing means,
and sealing means mounted in said sealing chamber in cooperative relationship with said shaft means to seal said pump chamber from said motor compartment.

17. The invention as defined in claim 9 and wherein:
hub means being formed on said pump-reservoir block means with a locating surface facing said armature,
one of said bearing means being mounted on said hub means and locating means effective between said armature and said locating surface to axially locate said armature in said motor compartment.

18. The invention as defined in claim 17 and there being:
an inner side surface on said hub means, said hub means forming a wall of said reservoir compartment,
and said plate means being sealingly secured on said inner side surface.

19. The invention as defined in claim 6 and there being:
hub means having an inner side surface, said hub means forming a wall of said reservoir compartment,
and said plate means being sealingly secured on said side surface of said hub means.

20. The invention as defined in claim 9 and having:
a bearing support block on the inside of said cover means,
said first shaft bearing means being mounted in said bearing support block.

21. The invention as defined in claim 20 and having brush holding means for said motor mounted on said bearing support block.

22. The invention as defined in claim 20 and said bearing support block having an outer peripheral locating surface extending about the central axis,
and magnet means for said motor having a corresponding inner peripheral locating surface mounted in juxtaposition about said bearing support block and being radially located relative to said central axis and said armature by said outer peripheral locating surface.

23. The invention as defined in claim 22 and having brush holding means integral with said support block whereby a predetermined relationship is established between said armature and said brush holder means and said magnet.

References Cited

FOREIGN PATENTS 1,180,630 11/1956 France.
1,229,217 7/1959 France.

ROBERT M. WALKER, Primary Examiner

U.S. Cl. X.R.

60—52; 310—268